United States Patent [19]

Romeo et al.

[11] Patent Number: 5,242,605
[45] Date of Patent: Sep. 7, 1993

[54] METHOD AND APPARATUS FOR REMOVING WATER FROM LUBRICANTS, COOLANTS AND THE LIKE

[75] Inventors: Clayton Romeo, Swan Hills; Daniel Smith, Onoway, both of Canada

[73] Assignee: Pumpjack Technical Assister Ltd., Canada

[21] Appl. No.: 940,474

[22] Filed: Sep. 4, 1992

[30] Foreign Application Priority Data

Jun. 9, 1992 [CA] Canada .................................. 2070889

[51] Int. Cl.⁵ ............................................. B01D 35/18
[52] U.S. Cl. .................................. 210/774; 210/799;
210/175; 210/179; 210/180; 210/181; 210/805;
210/408
[58] Field of Search ............... 210/774, 799, 175, 181,
210/805, 408, 413, 414, 179, 180; 366/136, 134

[56] References Cited

U.S. PATENT DOCUMENTS

| | | | |
|---|---|---|---|
| Re. 16,778 | 10/1927 | Kelley | 210/175 |
| 2,388,636 | 11/1945 | Harvuot | 210/180 |
| 2,864,502 | 12/1958 | May | 210/180 |
| 3,208,201 | 9/1965 | Oliver, III | 210/180 |
| 4,498,992 | 2/1985 | Garret, Jr. | 210/774 |
| 4,681,660 | 7/1987 | Budny | 210/805 |
| 4,971,704 | 11/1990 | Johnson, Sr. | 210/774 |

*Primary Examiner*—Robert A. Dawson
*Assistant Examiner*—Ana M. Fortuna
*Attorney, Agent, or Firm*—Davis, Bujold & Streck

[57] ABSTRACT

A method of removing water from lubricants, coolants and the like consisting of the following described steps. Firstly, pass lubricants through a heater at a predetermined flow rate to decrease its viscosity. Secondly, pass the heated lubricants through a vertical separation vessel which agitates the lubricants such that water entrained in the lubricants is released as steam. Thirdly, recirculate the heated lubricants repeatedly through the separation vessel at a recirculation flow rate that exceeds by many times the flow rate through the heater, thereby improving the degree of separation of water from the lubricants with each pass through the separation vessel. Fourthly, draw lubricants periodically from the separation vessel as the flow rate through the heater permits.

4 Claims, 4 Drawing Sheets

METHOD AND APPARATUS FOR REMOVING WATER FROM LUBRICANTS, COOLANTS AND THE LIKE

The present invention relates to a method and apparatus for removing water from lubricants, coolants and the like.

BACKGROUND OF THE INVENTION

Modern Society is becoming more sensitive to environmental concerns. This has lead to pressure to reuse lubricants, coolants and the like; as the present practise of dumping contaminates the environment.

Existing methods and apparatus for recycling used lubricants take the lubricants through a number of steps. The first step is passing the lubricants through a series of filters to remove particulate contaminants. The second step is heating the lubricants to decrease viscosity. The third step is passing the heated lubricants through a separation vessel which agitates the lubricants such that water entrained in the lubricants is released as steam. It has been determined that lubricants processed through these systems still have too high a content of water. In order to reduce water content, lubricants are repeatedly passed through the system, thereby achieving a better quality of Lubricants with each pass. When multiple passes through the system are employed, a limiting factor is the heating of the Lubricants. The time it takes to heat the lubricants unavoidably effects the flow rate.

SUMMARY OF THE INVENTION

What is required is a method and apparatus for removing water from lubricants, coolants and the like which is more time efficient.

According to the present invention there is provided a method of removing water from lubricants, coolants and the like which is comprised of the following described steps. Firstly, pass lubricants through heating means at a predetermined flow rate to decrease its viscosity. Secondly, pass the heated lubricants through a vertical separation vessel which agitates the lubricants such that water entrained in the lubricants is released as steam. Thirdly, recirculate the heated lubricants repeatedly through the separation vessel at a recirculation flow rate that exceeds by many times the flow rate through the heater, thereby improving the degree of separation of water from the lubricants with each pass through the separation vessel. Fourthly, draw lubricants periodically from the separation vessel as the flow rate through the heating means permits.

Most apparatus for removing water from lubricants can produce an adequate result, if the lubricants are recirculated through the system enough times. The problem is that this recirculation is time consuming. When the teachings of this method are followed the disadvantage of the unavoidably slow flow rate from the heating means is used as an opportunity for multiple passes through the separation vessel to occur without adversely effecting the overall flow rate. As a result, a much higher percentage of water is removed with each single pass through the system. Depending upon the degree of water contamination, a single pass through the system may be adequate.

Although beneficial results may be obtained through the use of the method as described, modifications to the method may be required to ensure adequate removal of particulate contaminants. The most demanding of the lubricant recycling applications is that of recycling lubricants from railroad engines which are generally contaminated by both soot and water. Prior to the development of the present invention the best that could be achieved was lubricants clean enough to be reused when mixed in a 50/50 mixture with new lubricants. Even more beneficial results may, therefore, be obtained by passing the heated lubricants through a centrifuge thereby facilitating the separation of particulate contaminants which due to their differing density are urged to the periphery of the centrifuge by centrifugal force. According to this method lubricants are repeatedly recirculated through both the centrifuge and the separation vessel.

According to another aspect of the invention there is provided an apparatus for removing water from lubricants, coolants and the like, which is comprised of a separation vessel having a primary chamber and a secondary chamber. The primary chamber has an inlet, a recirculation outlet, and means for agitating lubricants as they pass from the inlet to the recirculation outlet. Lubricants passing through the inlet are agitated whereby water entrained in the lubricants is relesed as steam. The secondary chamber has a recirculation inlet, an outlet, and a spillway whereby lubricants overflowing the secondary chamber reenter the primary chamber and pass through the lubricant agitating means. A recirculation conduit is connects the recirculation outlet of the primary chamber with the recirculation inlet of the secondary chamber. Pump means is provided on the recirculation conduit whereby lubricants are repeatedly recirculated from the recirculation outlet of the primary chamber to the recirculation inlet of the secondary chamber. Means is provided for controlling the flow of lubricants from the outlet of the secondary chamber.

Although beneficial results may be obtained through the use of the apparatus described in relation to removal of water from lubricants, coolants and the like; some lubricants are further contaminated by particulate contaminants. Even more beneficial results may, therefore, be obtained by interposing a centrifuge between the recirculation conduit and the recirculation inlet of the secondary chamber, such that lubricants passing through the inlet of the separation vessel must first pass through the centrifuge. The centrifuge facilitates the separation of particulate contaminants which due to their differing density are urged to the periphery of the centrifuge by centrifugal force.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
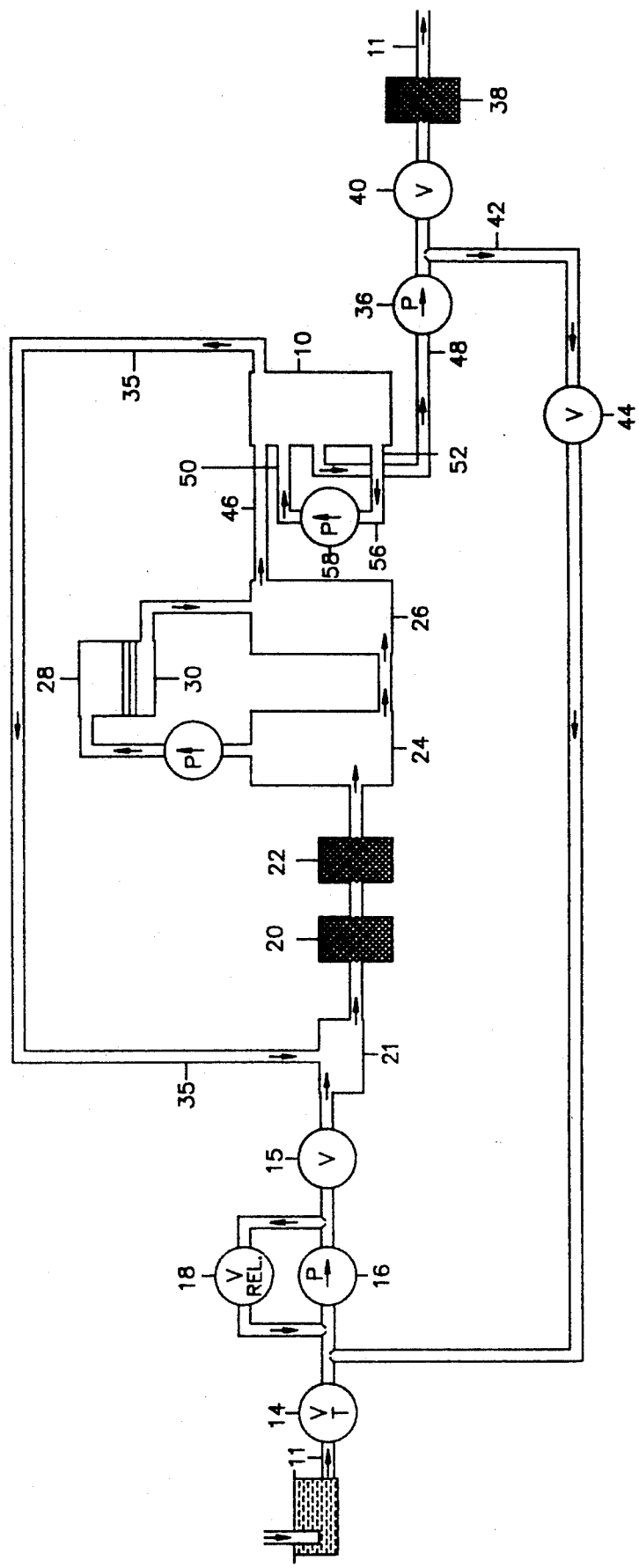
FIG. 1 is a flow diagram of a first method for recycling lubricants constructed in accordance with the teachings of the present invention.

There will now be described two closely related methods illustrated in FIGS. 1 and 3 and the apparatus which serve an integral role in the described methods. The preferred apparatus, separation vessels generally identified by reference numerals 10 and 12, respectively will now be described with reference to FIGS. 2 and 4.

Those aspects of the methods illustrated in FIGS. 1 and 3 which are considered to be "conventional" will first be described. A primary flow line 11 is provided. A primary shutoff valve 14 controls the flow of a lubricant/water mixture into primary flow line 11. A pump 16 is provided to facilitate movement of the lubricant/water mixture. A pressure relief valve 18 is provided adjacent pump 16 to accommodate pressure fluctuations. A second shutoff valve 15 is provided downstream of the pump 16, primarily for the purpose of isolating pump 16. The lubricants/water mixture is passed through a series of filters 20, 22 to remove particulate contaminants. The lubricants/water mixture is then passed through heating means generally identified by reference numeral 24. Heating means 24, as illustrated, consists of a heat exchanger 26, which uses a glycol heater 28 as a heat source. A glycol solution within glycol heater 28 is heated by a heating element 30. Referring to FIG. 1, the lubricants/water mixture is then passed through separation vessel 10. A vapour outlet line 35 is provided for the removal of steam. Vapour outlet line 35 passes through heat exchanger 21 for the purpose of heat exchange. A secondary pump 36 is provided downstream of separation vessel 10. Pump 36 pumps processed lubricants through a polish filter 38 to remove fine particular matter and out of primary flow line 11. Due to the fact that the lubricants are never properly processed after just one pass, a valve 40 is provided downstream of separation vessel 10 which shuts off primary flow line 11 and a "recycle" line 42 diverts the partially processed lubricant/water mixture back to an entry point on primary flow line 11 between primary shutoff valve 14 and pump 16. In the "recycle" mode valve 14 is closed to prevent unprocessed lubricants/water into primary flow line and valve 40 is closed to prevent partially processed lubricants/water from vacating primary flow line 11. Pump 16 then draws the partially processed lubricant/water mixture back through filters 20, 22, heating means 24, and separation vessel 10. After repeated passes in this "recycle" mode the lubricants have had sufficient particulate contaminants and water removed to be considered "processed". Recycle line 42 has a shutoff valve 44. By shutting recycle shutoff valve 44 and opening valve 40, the "processed" lubricants may be passed through polish filter 38 and vacated from primary flow line 11. When this process was followed the time required to heat the lubricant/water mixture in heating means 24 always limited flow. As will apparent from the description which follows the described method illustrated in FIG. 1, provides a superior degree of processing within the functional limitations of the heating means.

Figure 2:
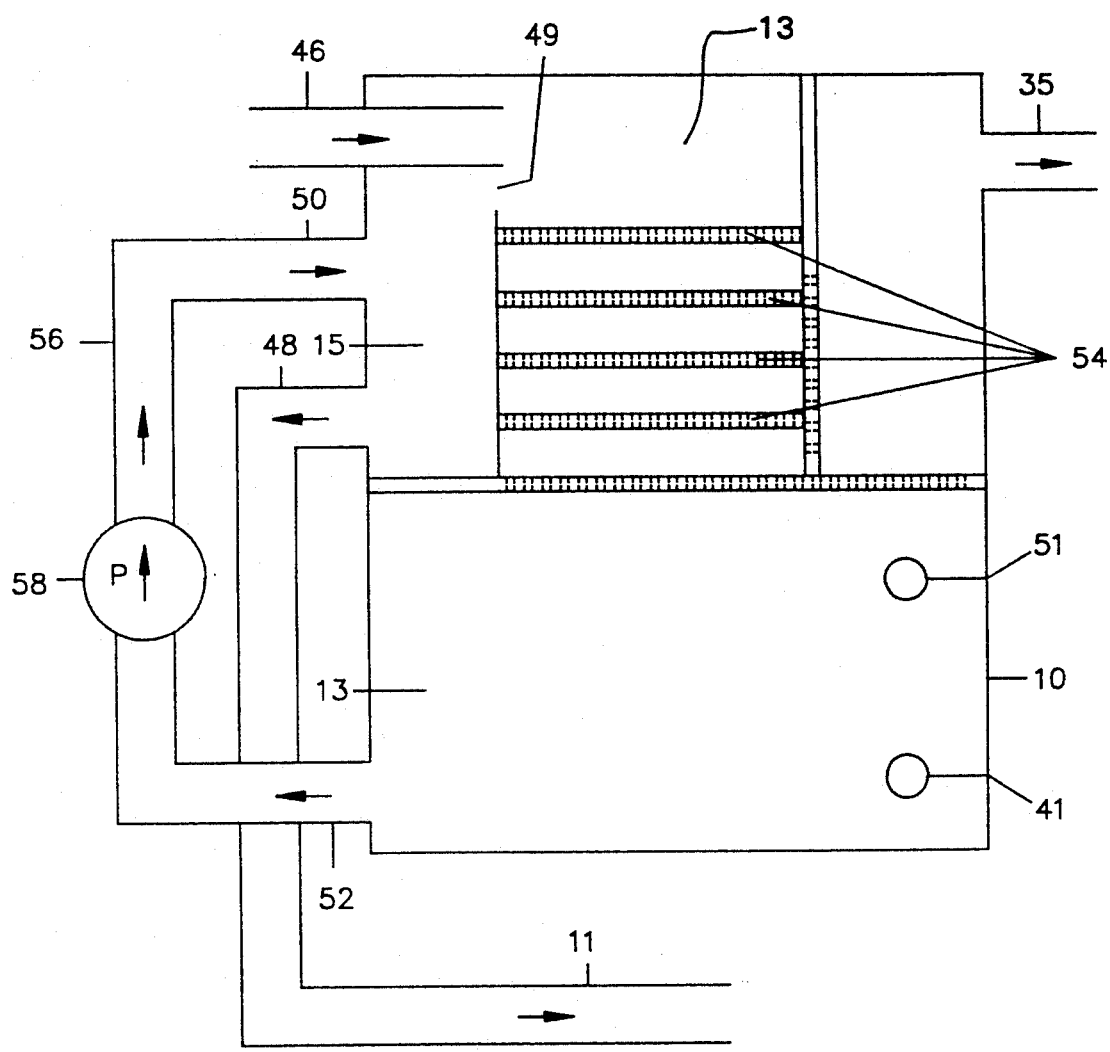
FIG. 2 is a longitudinal section view of a separation vessel constructed in accordance with the teachings of the present invention.

The preferred method of recycling lubricants, as illustrated in FIG. 1, adds a "recirculation" flow path to the conventional configuration. It will be of assistance in describing the method to first describe apparatus 10. Referring to FIG. 2, separation vessel 10 has a primary chamber 13 and a secondary chamber 15. Primary chamber 13 has an inlet 46, a recirculation outlet 52, and means for agitating lubricants as they pass from inlet 46 to recirculation outlet 52. The means for agitating the lubricants as illustrated in FIG. 2, are a series of separation stages demarcated by perforated rings 54. Lubricants passing through inlet 46 are agitated whereby water entrained in the lubricants is released as steam. Secondary chamber 15 has a recirculation inlet 50, an outlet 48, and a spillway 49 whereby lubricants overflowing secondary chamber 15 reenter primary chamber 13 and pass through rings 54. A recirculation conduit 56 connects recirculation outlet 52 with recirculation inlet 50. A pump 58 is provided on recirculation conduit 56. In the method, lubricants are passed through heating means 24 at a flow rate, determined by the functional limitation of heating means 24, to decrease its viscosity in accordance with conventional teachings. Then, the heated lubricants are passed into inlet 46 of separation vessel 10 such that the lubricants pass from one level of rings 54 to another, whereby water entrained in the lubricants is released as steam. The steam is vented through vapour outlet line 35. Instead of recycling the partially processed lubricant/water mixture back through primary flow line 11, pump 58 on recirculation conduit 56 is used to repeatedly recirculate the lubricant/water mixture from recirculation outlet 52 to recirculation inlet 50 for recirculation through separation vessel 10 at a recirculation flow rate that exceeds by many times the flow rate through heating means 24. As secondary chamber 15 becomes full, lubricants overflow secondary chamber 15 and reenter primary chamber 13 for reprocessing. The recirculating of the lubricants repeatedly through separation vessel 10 at a recirculation flow rate that exceeds by many times the flow rate through heating means 24, improves the degree of separation of water from the lubricants with each pass through the separation vessel. Lubricants are drawn from outlet 48 on secondary chamber 15 of separation vessel 10 at periodic intervals as the flow rate through heating means 24 permits. This enables the present method to maintain the same flow rate as prior art devices and yet achieve a greatly enhanced removal of water. In the prototype the lubricant/water mixture was recirculated through separation vessel eight times, while still drawing from outlet 48 at a flow rate substantially the same as flow rate through heating means 24. The means for controlling the flow of lubricants from outlet 48 of secondary chamber 15 is controlled by float mechanisms 41 and 51. The upper limit of the liquid level in primary chamber 13 is controlled by float mechanism 51. When the liquid level reaches float mechanism 51, pump 36 is activated to draw excess fluids from outlet 48. When the liquid level drops down to float mechanism 41, pump 36 is shut off to maintain a minimum operating of liquid level required for recirculating lubricants from primary chamber 13 to secondary chamber 15.

Figure 3:
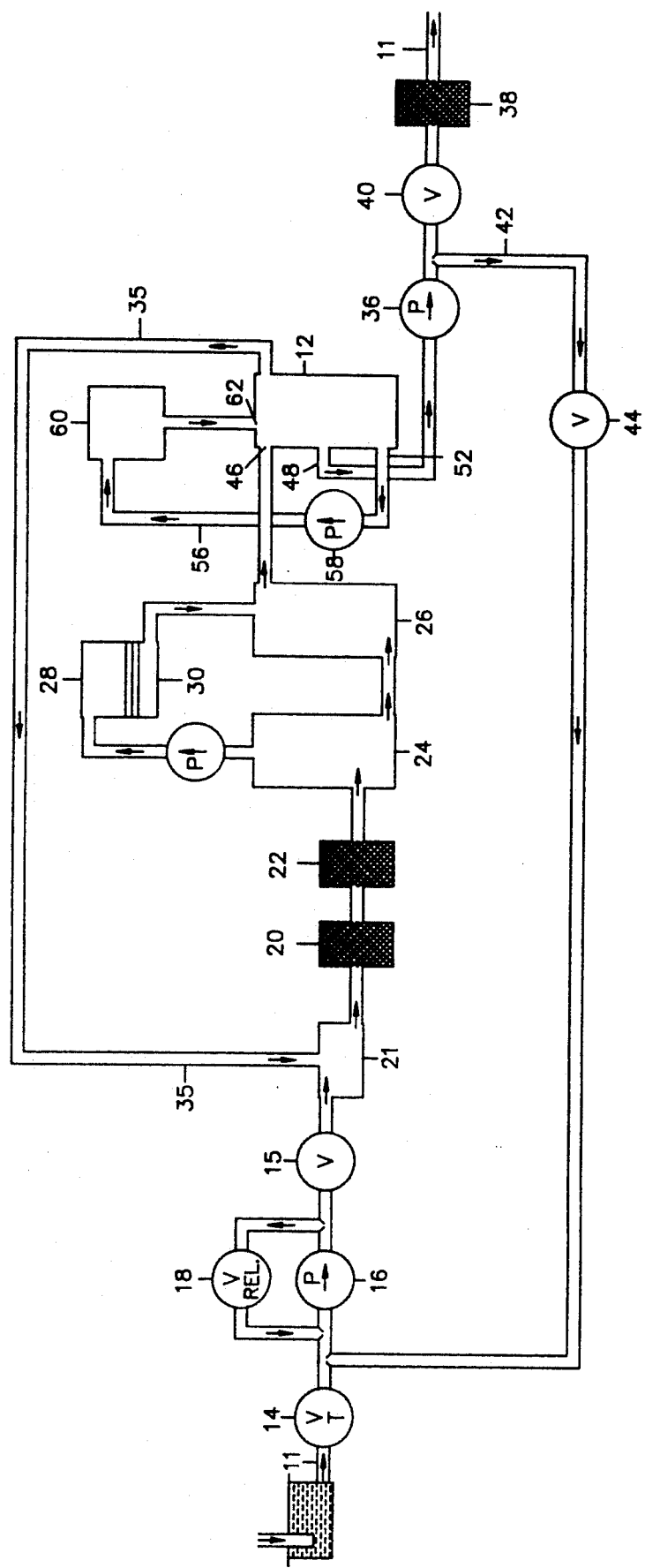
FIG. 3 is a flow diagram of a second method for recycling lubricants constructed in accordance with the teachings of the present invention.
Figure 4:
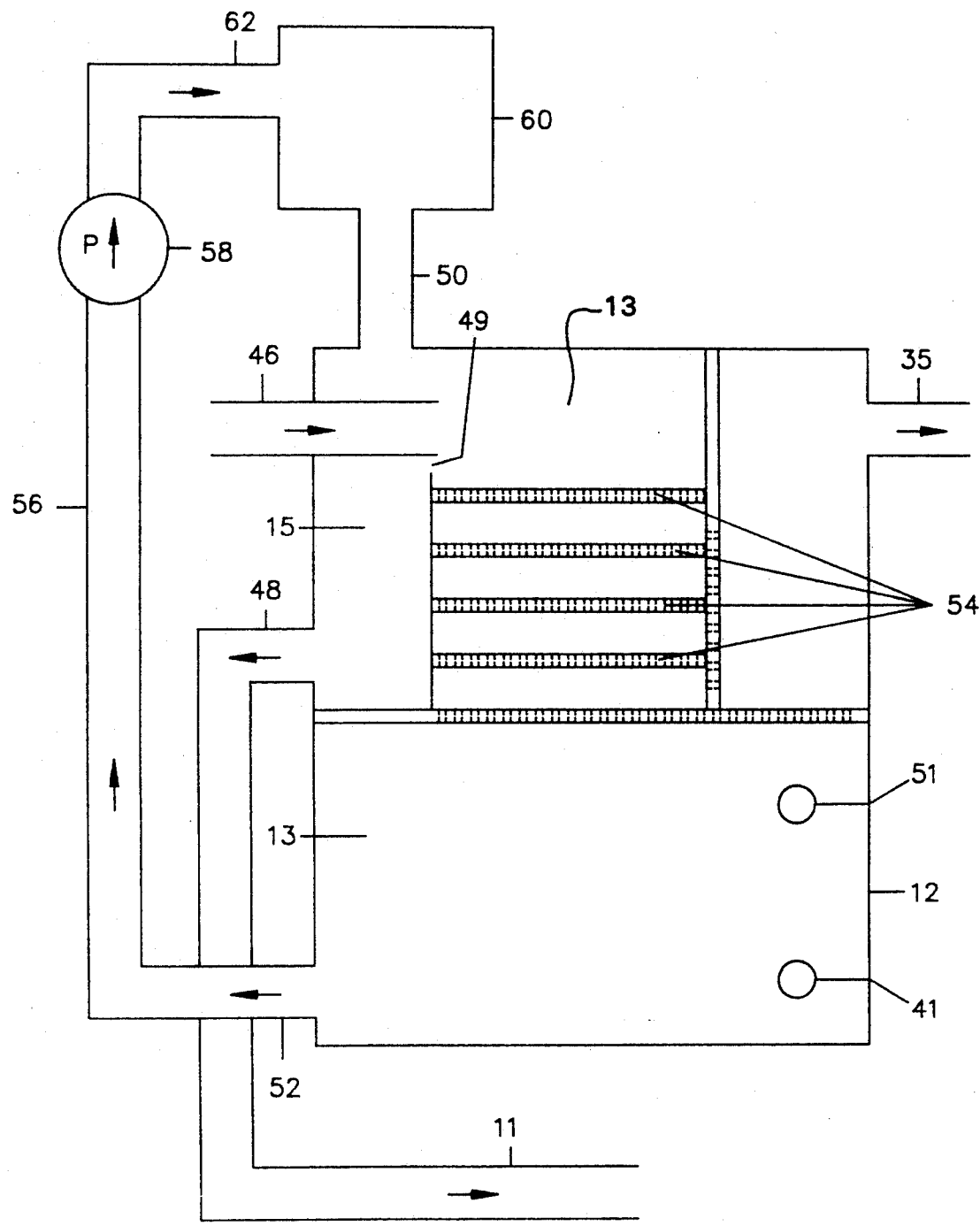
FIG. 4 is a longitudinal section view of a separation vessel/centrifuge combination constructed in accordance with the teachings of the present invention.

The method illustrated in FIG. 3 is based upon the same inventive concept. It resulted from a desire to enhance the removal of particulate contaminants in some types of railway engine oil. It will be appreciated by one skilled in the art that the following enhancements are not necessary where the level of particulate contaminants in the lubricants is low enough that the filters 20, 22, and 38 can adequately perform that function. This method involves that addition of a centrifuge 60 and a series of changes which are necessary as a result of that addition. It will be of assistance in describing the method to first describe apparatus 12. To avoid confusion the reference numerals will be kept the same as on FIG. 2 except where a change has been made. Referring to FIG. 4, apparatus 12 is a separation vessel to which centrifuge 60 has been added. Centrifuge 60 may be spacially separated from separation vessel 12 without effecting operation, but it is preferred that centrifuge 60 be supported directly above separation vessel 12. Centrifuge 60 is interposed at connection 62 between recirculation conduit 56 and recirculation inlet 50 of secondary chamber 15. Lubricants passing through recirculation inlet 50 of secondary chamber 15 of separation vessel 12 must first pass through centrifuge 60. Centrifuge 60 facilitates the separation of particulate contaminants which due to their differing density are urged to the periphery of the centrifuge by centrifugal force. Pump 58 on recirculation conduit 56 is used to repeatedly recirculate lubricants from recirculation outlet 52 through centrifuge 60 to recirculation inlet 50. In the method as modified lubricants is repeatedly recirculated through both centrifuge 60 and separation vessel 12. This enhances both the removal of particulate contaminants and the removal of water. It has been determined that passing the lubricant/water mixture through the centrifuge enhances the operation of the separation vessel in the removal of water. It is felt that this is due to the additional agitation of the lubricant/water mixture which occurs in centrifuge 60.

It will be apparent to one skilled in the art that modifications may be made to the preferred embodiment without departing from the spirit and scope of the invention as defined by the claims.

The embodiments of the invention in which an exclusive property or Privilege is claimed are defined as follows:

1. A method of removing water from a lubricant, comprising the following steps:
   a. passing the lubricant through heating means at a predetermined flow rate to decrease its viscosity;
   b. passing the heated lubricant through a separation vessel which agitates the lubricant such that water entrained in the lubricant is released as steam;
   c. recirculating the heated lubricant repeatedly through the separation vessel at a recirculation flow rate that exceeds by many times the flow rate through the heating means, thereby improving the degree of separation of water from the lubricant with each pass through the separation vessel; and
   d. drawing lubricant from the separation vessel at periodic intervals as the flow rate through the heating means permits.

2. A method of removing water from a lubricant, comprising the following steps:
   a. passing the lubricant through heating means at a predetermined flow rate to decrease its viscosity;
   b. passing the heated lubricant through a centrifuge thereby facilitating the separation of particulate contaminants which due to their differing density are urged to the periphery of the centrifuge by centrifugal force;
   c. passing the centrifuged heated lubricant through a separation vessel which agitates the lubricant such that water entrained in the lubricant is released as steam;
   d. recirculating the lubricant repeatedly through the centrifuge and the separation vessel at a recirculation flow rate that exceeds by many times the flow rate through the heating means, thereby improving the degree of separation of water and soot from the lubricant with each pass through the centrifuge and the separation vessel; and
   e. drawing lubricant from the separation vessel at periodic intervals as the flow rate through the heating means permits.

3. An apparatus for removing water from a lubricant, comprising:
   a. a separation vessel being divided into a primary chamber and a secondary chamber, the primary chamber having an inlet, a recirculation outlet, and means for agitating the lubricant as it passes from the inlet to the recirculation outlet such that the lubricant passing through the inlet is agitated whereby water entrained in the lubricant is released as steam, the secondary chamber having a recirculation inlet, an outlet, and a spillway whereby lubricant overflowing the secondary chamber reenters the primary chamber, via the spillway, and pass through the lubricant agitating means;
   b. a recirculation conduit connecting the recirculation outlet of the primary chamber with the recirculation inlet of the secondary chamber; and
   c. pump means in the recirculation conduit whereby the lubricant is repeatedly recirculated from the recirculation outlet of the primary chamber to the recirculation inlet of the secondary chamber; and
   d. means for controlling the flow of the lubricant from the outlet of the secondary chamber.

4. An apparatus for removing water from a lubricant, comprising:
   a. a separation vessel being divided into a primary chamber and a secondary chamber, the primary chamber having an inlet, a recirculation outlet, and means for agitating the lubricant as it passes from the inlet to the recirculation outlet such that the lubricant passing through the inlet is agitated whereby water entrained in the lubricant is released as steam, the secondary chamber having a recirculation inlet, an outlet, and a spillway whereby lubricant overflowing the secondary chamber reenters the primary chamber, via the spillway, and pass through the lubricant agitating means;
   b. a recirculation conduct connecting the recirculation outlet of the primary chamber with the recirculation inlet of the secondary chamber;
   c. a centrifuge connected with the recirculation conduit such that the lubricant entering the recirculation inlet of the secondary chamber of the separation vessel must first pass through the centrifuge, the centrifuge facilitating the separation of particulate contaminants which due to their differing density are urged to the periphery of the centrifuge by centrifugal force;
   d. pump means in the recirculation conduit whereby the lubricant is repeated recirculated from the recirculation outlet of the primary chamber through the centrifuge to the recirculation inlet of the secondary chamber; and
   e. means for controlling the flow of the lubricant from the outlet of the secondary chamber.

* * * * *